Patented Nov. 28, 1933

1,937,284

UNITED STATES PATENT OFFICE

1,937,284

CATALYST FOR THE PREPARATION OF ESTERS

Jerome Martin, Terre Haute, Ind., and Ignace J. Krchma, Baltimore, Md., assignors to Commercial Solvents Corporation, Terre Haute, Ind., a corporation of Maryland No Drawing. Original application May 16, 1928, Serial No. 278,333, now Patent No. 1,817,898. Divided and this application August 13, 1930. Serial No. 475,117

5 Claims. (Cl. 23—237)

Our invention relates to a method of preparing esters by passing alcohols over suitable catalysts. More particularly, our process pertains to an improved method of obtaining esters such as ethyl acetate, propyl propionate, butyl butyrate, ethyl butyrate, etc.

In the past it has been necessary to prepare esters by some such means as esterification of an alcohol with an acid, or by alcoholysis. In the latter case, it is necessary to make use of an ester which has previously been prepared by esterification, so it is readily seen that the former method has been basic for preparing esters.

We are aware of the fact that it has recently been claimed (English Patent 282,448) that it is possible to obtain condensation products by passing alcohols over suitable catalysts. According to this proces, however, which consists of passing an alcohol, such as ethyl alcohol, at ordinary pressure and at a temperature of 400–500° C. over catalysts such as barium oxide, magnesia, lime, manganese oxide, magnesium alcoholate, and sodium alcoholate, there is obtained a mixture of alcohols, acids, esters, acetals, acetone, and acetaldehyde. According to a specific example, when ethyl alcohol was passed over a catalyst composed of barium oxide, the products consisted of higher alcohols, such as butyl alcohol, acids, esters, such as ethyl acetate, acetals, particularly diethyl acetal, and aldehyde. Our new process of preparing esters has very distinct advantages over this process, in that we are able to obtain much higher yields of esters together with only relatively small amounts of other materials which may readily be separated from the main product and which may be utilized for other purposes, thereby reducing the operating losses to a minimum.

The formation of esters from alcohols under the influence of certain catalysts at high temperatures may be regarded as taking place as follows:

$$2C_2H_5OH = C_2H_5OOC.CH_3 + 2H_2$$

$$2C_4H_9OH = C_4H_9OOC.C_3H_7 + 2H_2$$

$$C_2H_5OH + C_4H_9OH = C_2H_5OOC.C_3H_7 + 2H_2$$

While we do not know the exact mechanism of the reaction, it appears that the alcohol may be first dehydrogenated into the corresponding aldehyde, two molecules of which, under certain conditions, then condense to form an ester. This theory is at least partially corroborated by the fact that Tistschenko (Jour. Russ. Phys. Chem. Soc. 38, ii, 355—418, 482—550) found that it was possible to obtain esters such as ethyl acetate from acetaldehyde or propyl propionate from propaldehyde, by the use of an aluminium alkoxide catalyst. More recently, modifications of this process have been patented by Imray (British Patent 1288—1915) and Mugdan and Herrmann (U. S. Patent 1,459,852). We have found, however, that when an aldehyde and an alcohol are passed under similar operating conditions over catalysts of the character hereinafter described, much lower yields of esters are obtained from the aldehyde than from the corresponding alcohol. We have also found that the amount of high-boiling material, other than ester, formed during the condensation process is greatly reduced by the use of an alcohol as the raw material.

As has previously been pointed out, esters can be produced from primary alcohols, such as ethanol and butanol, by means of a number of different catalysts. We have now discovered a new type of catalyst quite different from any previously recommended for this purpose and which has the decided advantage of giving much larger yields of the desired products, together with smaller proportions of undesired products. As will be seen from the examples cited below, the composition of our new and improved catalyst may be varied considerably and still give satisfactory results. Examples of a number of the catalysts which we have tried are shown in the table given below.

Table I

| Catalyst No. | Initial composition of catalyst |
|---|---|
| A—66—M | $Ba_2UO_2(CO_3)_3.Ag_2CO_3.Al(OH)_3$ |
| A—65—M | $Ba_2UO_2(CO_3)_3.\tfrac{1}{2}Ag_2CO_3.2Al(OH)_3$ |
| A—88—M | $Ba_2UO_2(CO_3)_3.\tfrac{1}{4}Ag_2CO_3.\tfrac{1}{8}Al(OH)_3$ |
| A—93—M | $Ba_2UO_2(CO_3)_3.Ag_2CO_3.Th(OH)_4$ |
| A—97—M | $Ag_4UO_2(CO_3)_3.Ag_2CO_3.Al(OH)_3$ |
| A—99—M | $Zn_2UO_2(CO_3)_3.Ag_2CO_3.\tfrac{1}{4}Th(OH)_4$ |
| A—101—M | $Ba_2UO_2(CO_3)_3.\tfrac{1}{4}Ag_2CO_3.\tfrac{1}{8}Zr(OH)_4$ |
| A—102—M | $Zn_2UO_2(CO_3)_3.\tfrac{1}{2}Ag_2CO_3$ |
| A—129—M | $BaU_2O_7.\tfrac{1}{2}Ag_2O.\tfrac{1}{4}Al(OH)_3$ |
| A—141—M | $Ba_2UO_2(CO_3)_3.Ag.Al(OH)_3$ |
| A—134—M | $Ba(HPO_4)_2.UO_2HPO_4.\tfrac{2}{3}Ag_3PO_4.AlPO_4$ |
| A—132—M | $Ba_2UO_2(CO_3)_3.Ag_2O.Al(OH)_3$ |

As will be seen from a consideration of the above table, the essential constituents of these catalysts are metallic silver or a silver compound, which under the operating conditions is probably quickly reduced to metallic silver, and a metal uranyl compound, the term "metal" being applied generally to metals other than uranium. The ratio of silver compound to metal uranyl compound in the catalyst may be varied within wide limits without seriously affecting their catalytic activity. The metals to be used in the metal uranyl carbonate compound may be derived from an element or elements occurring in groups I, II or IV of Mendelejeff's periodic table. The elements which we have successfully used for this purpose include: calcium, strontium, barium, magnesium, zinc, silver, and lead.

In addition to the silver compound and metal uranyl compound, we have found it advisable to have present another compound such as a hydroxide of an element or elements occurring in groups IIb to IV inclusive, of the periodic table. (By group IIb is meant the subgroup of group II which contains zinc, cadmium and mercury.) Compounds of this type which we have successfully used are: beryllium, aluminium, thorium, and zirconium hydroxides. These metal hydroxides appear to aid chiefly in hardening the catalysts, altho there is some indication that they serve to some extent as promoters also. Even without this effect, however, a catalyst containing a metal hydroxide of the character specified lasts much longer than one not containing such a material.

A method of preparing our catalyst may be illustrated by the following example. It is distinctly understood, however, that we do not confine ourselves to this exact method nor to the amounts of materials mentioned. One-fifth gram mol of uranyl nitrate, $UO_2(NO_3)_2 \cdot 6H_2O$; two-fifths gram mol of barium nitrate, $Ba(NO_3)_2$; two-fifths gram mol silver nitrate, $AgNO_3$; and one-fifth gram mol aluminium nitrate, $$Al(NO_3)_3 \cdot 9H_2O$$

are dissolved in four liters of distilled water. To this solution is next added a solution of 160 grams of potassium carbonate, $K_2CO_3$, in two liters of water. The resulting precipitate is then washed by decantation with distilled water until free from nitrate ions. The precipitate is filtered, pressed dry, and then slowly dried at 50° C. for 48 hours. The dried cake thus formed is broken up to 8-14 mesh and used for the catalytic conversion of alcohols to esters.

Instead of effecting the precipitation as described above to give the carbonate form, the corresponding hydrate or phosphate, etc. compounds such as shown by catalysts A—129—M and A—134—M may be likewise obtained. Such compositions, however, do not give as satisfactory results as when the corresponding carbonate is employed.

Another satisfactory method of preparing our catalyst is illustrated by the method followed in preparing catalyts A—132—M. In this case, the requisite amount of $Ag_2O$ was thoroughly mixed with precipitated aluminium hydroxide and barium uranyl carbonate. Satisfactory results may also be obtained by substituting colloidal silver for the silver oxide.

A number of methods may be employed for preparing and sending the alcohol or alcohols over the catalyst. One method of accomplishing this is to force the said alcohol or alcohols over the catalyst by means of carbon dioxide or other inert gas under pressure. The liquid alcohol is in this process vaporized directly in the catalyst chamber. A second method of carrying out the process which we have found to be satisfactory is to bubble carbon dioxide gas thru the alcohol or alcohols which it is desired to convert, and pass the vapor thus obtained over the catalyst.

In order to effect the conversion of alcohols to esters by our new method, the alcohol or alcohols, alone or mixed with carbon dioxide or other inert gas or gases, is passed over catalysts prepared as described, at temperatures preferably from 250° to 400° C., using a pressure of preferably from about 1 to about 200 atmospheres. While it is possible to use temperatures outside of the range specified, we have found that, as a rule, temperatures below 250° C. give low conversions and temperatures above 400° C. give too many side reactions. We may, however, use temperatures as low as 200° C. and as high as 450° C.

The table given below shows data on the conversion of ethyl alcohol to ethyl acetate under different conditions and with different catalysts. In each case, 10 c. c. of catalyst having the initial composition shown in Table I was used. It should be pointed out that the catalyst mixture is composed wholly of carbonates only at the beginning of the operation. Soon after the operation starts, the silver carbonate is probably reduced to silver and it is probable that the metal uranyl carbonate is also decomposed to some extent. Part of these runs were made with ordinary 95% ethyl alcohol and part with alcohol containing 5% water and about 1% acetaldehyde.

Table II

| Run | Catalyst | Pressure lbs. per sq. in. | Temp. ° C. | Rate of flow c. c. per hr. | Ester formed grs. per 100 c. c. condensate |
|---|---|---|---|---|---|
| 1 | A—102—M | 250 | 200 | 50 | 2.01 |
| 2 | A—102—M | 250 | 300 | 60 | 3.96 |
| 3 | A—102—M | 250 | 400 | 50 | 5.32 |
| 4 | A—102—M | 500 | 300 | 50 | 10.19 |
| 5 | A—102—M | 500 | 350 | 50 | 10.10 |
| 6 | A—102—M | 500 | 450 | 50 | 1.48 |
| 7 | A—102—M | 500 | 350 | 50 | 8.29 |
| 8 | A—66—M | 200 | 350 | 50 | 7.65 |
| 9 | A—65—M | 3000 | 350 | 100 | 6.98 |
| 10 | A—92—M | 3000 | 350 | 80 | 11.10 |
| 11 | A—91—M | 3000 | 350 | 80 | 10.40 |

In runs 9—10—11, a mixture composed of 70% hydrogen and 30% carbon dioxide was used to force the alcohol over the catalyst. This gas mixture was also used in run #1 shown in the next table.

The following table shows results similarly obtained with n-butyl alcohol. Runs 1 and 4 were made with 10 c. c. of catalyst, the remainder with 20 c. c.

Table III

| Run | Catalyst | Pressure lbs. per sq. in. | Temp. ° C. | Rate of flow c. c. per hr. | Ester formed grs. per 100 c. c. condensate |
|---|---|---|---|---|---|
| 1 | A—66—M | 3000 | 350 | 100 | 11.5 |
| 2 | A—66—M | 200 | 350 | 50 | 50.0 |
| 3 | A—66—M | 200 | 350 | 50 | 41.3 |
| 4 | A—97—M | 3000 | 350 | 60 | 19.3 |
| 5—a | A—129—M | 50 | 300 | 35 | 8.75 |
| —b | A—129—M | 200 | 300 | 28 | 11.73 |
| 6 | A—132—M | 50 | 300 | 33 | 37.83 |
| 7—a | A—134—M | 300 | 300 | 30 | 2.87 |
| —b | A—134—M | 50 | 300 | 30 | 1.60 |

The results shown in Tables II and III above, were obtained by one passage over the catalyst. In addition to the unconverted alcohol and the ester, there are formed also small quantities of high-boiling materials, as well as small amounts of the aldehyde of the alcohol used. The amounts of these high-boiling materials may be kept at a minimum by conducting the reaction at as low temperatures as is consistent with the rate of conversion and yield of the desired ester.

In the examples described above, we have only shown specific data relating to the production of ethyl acetate and butyl butyrate. It is distinctly understood, however, that our process applies also to the production of other similar esters such as propyl propionate, ethyl butyrate, ethyl propionate, propyl butyrate, etc.

This is a divisional application of our copending application U. S. Serial No. 278,333, filed May 16, 1928, now Patent No. 1,817,898 of which copending applications Serial Nos. 537,500 and 537,501, now Patents Nos. 1,869,761 and 1,869,762 are also divisions.

Now having described our invention, what we claim as new and novel is:

1. Catalysts for the conversion of primary alcohols having more than one carbon atom to esters which comprise initially metal uranyl carbonates and silver carbonate.
2. Catalysts for the conversion of primary alcohols having more than one carbon atom to esters which comprise metal uranyl carbonates and metallic silver.
3. Catalysts for the conversion of primary alcohols having more than one carbon atom to esters which comprise metal uranyl carbonates, metallic silver, and hydroxides of metals selected from the group consisting of aluminium, thorium, zirconium and beryllium.
4. Catalysts for the conversion of primary alcohols having more than one carbon atom to esters which comprise initially silver carbonate and uranyl carbonates of metals selected from the group consisting of calcium, strontium, barium, magnesium, zinc, silver and lead.
5. Catalysts for the conversion of primary alcohols having more than one carbon atom to esters which comprise initially silver carbonate, uranyl carbonates of metals selected from the group consisting of calcium, strontium, barium, magnesium, zinc, silver and lead; and hydroxides of metals selected from the group consisting of aluminium, thorium, zirconium and beryllium.

JEROME MARTIN.
IGNACE J. KRCHMA.